(12) United States Patent
Koymen

(10) Patent No.: US 9,046,743 B2
(45) Date of Patent: Jun. 2, 2015

(54) SLIDER SUPPORT MEMBER

(71) Applicant: Kadir Koymen, Ankara (TR)

(72) Inventor: Kadir Koymen, Ankara (TR)

( * ) Notice: Subject to any disclaimer, the term of this patent is extended or adjusted under 35 U.S.C. 154(b) by 0 days.

(21) Appl. No.: 13/933,399

(22) Filed: Jul. 2, 2013

(65) Prior Publication Data

US 2014/0161434 A1  Jun. 12, 2014

(30) Foreign Application Priority Data

Dec. 6, 2012 (TR) ............................... a 2012 14252
Mar. 28, 2013 (TR) ............................... a 2013 03797

(51) Int. Cl.
*G03B 17/00* (2006.01)
*G03B 17/56* (2006.01)

(52) U.S. Cl.
CPC .................................... *G03B 17/561* (2013.01)

(58) Field of Classification Search
CPC ..................................................... G03B 17/561
USPC ......................................................... 396/428
See application file for complete search history.

(56) References Cited

U.S. PATENT DOCUMENTS

| | | | | |
|---|---|---|---|---|
| 3,586,278 A * | 6/1971 | Simons | ........................ | 248/165 |
| 4,337,781 A * | 7/1982 | Brundage | ...................... | 460/104 |
| 7,092,557 B2 * | 8/2006 | Eisfeld et al. | ................. | 382/128 |
| 7,878,123 B2 * | 2/2011 | Jackson | ........................ | 105/144 |
| 7,891,888 B2 * | 2/2011 | Wood | ............................ | 396/428 |
| 8,721,199 B1 * | 5/2014 | Hart | .............................. | 396/428 |
| 2003/0116331 A1 * | 6/2003 | Boyl-Davis et al. | ............. | 173/1 |
| 2009/0268993 A1 * | 10/2009 | Tsai | .................................... | 384/7 |
| 2010/0108412 A1 * | 5/2010 | A/L Lynkaran et al. | ..... | 180/9.22 |
| 2011/0102744 A1 * | 5/2011 | Saad et al. | .................... | 352/243 |
| 2012/0138763 A1 * | 6/2012 | Russell | ......................... | 248/310 |
| 2012/0269504 A1 * | 10/2012 | Chapman | ..................... | 396/428 |
| 2012/0281117 A1 * | 11/2012 | Hiratsuka | .................... | 348/239 |
| 2013/0049276 A1 * | 2/2013 | Fregeau | ......................... | 269/56 |
| 2013/0095981 A1 * | 4/2013 | Chung-Ting et al. | ........... | 482/66 |
| 2013/0145301 A1 * | 6/2013 | Kim et al. | ..................... | 715/772 |

* cited by examiner

*Primary Examiner* — Clayton E Laballe
*Assistant Examiner* — Linda B Smith
(74) *Attorney, Agent, or Firm* — Brinks Gilson & Lione

(57) ABSTRACT

A slider support member (S) according to the present invention providing a movable connection between a camera and a support member secured to the ground comprises two tracks (1); a member (2) connecting the tracks (1) to each other from one of their ends; movable connection members (3a, 3b), each thereof comprising a connection part (7a, 7b) to be connected to the camera or to the support member, and one (3a) thereof comprising a movable member (4a) and being connected to the tracks (1) in a movable manner so as to leave the tracks (1) between the movable members (4a), and the other (3b) thereof being connected to the tracks (1) in a movable manner so as to stay between the tracks (1); and a control unit (9) comprising a motor providing the drive of a belt (5), a controller controlling the operation of the motor, an adjustment switch (10) to transfer the operation parameter of the motor to the controller, and at least one sensor detecting the presence of the hand of the respective user and controlling the displacement of the motor by transmitting a trigger signal to the controller.

20 Claims, 5 Drawing Sheets

SLIDER SUPPORT MEMBER

CROSS-REFERENCE TO RELATED APPLICATIONS

This application is related to, and claims all benefit from, Turkish Patent Application TR2012/14252 filed Dec. 6, 2012 and Turkish Patent Application TR2013/03797 filed Mar. 28, 2013.

FIELD OF INVENTION

The present invention relates to a slider support member providing a movable connection for imaging devices, e.g. a photographic camera or a movie camera, to a support member.

PRIOR ART

An imaging device such as a photographic camera or a movie camera can be fixed to the ground by means of a support member (e.g. a tripod or a Mitchell Mount) for preventing the vibrations occurring during an image capturing process. However, while a movie is taken using a camera, it may be necessary to move the camera along a horizontal axis. For this reason, slider support members are used for providing a movable connection between the camera and the support member. These slider support members typically comprise at least one track fixed to the support member, and at least one connection member which can be moved along this track and to which a camera can be fastened. Thus, the camera can be moved relative to the support member with moving the connection member on the track.

In the patent document US2010008661A1 according the prior art is disclosed a slider support member system. According to that system, a movable member to which a camera is secured is connected between two tracks so as to move on these tracks. Said connection is provided by means of a plurality of movable members (e.g. wheels) surrounding the tracks. However, in that system, the camera can be moved only over the distance of one track length. Therefore, when it is desired to move the camera over a longer distance, a slider support member is used which comprises longer tracks. Increasing the length of the slider support member, however, brings about some difficulties in transportation or storage which are not desired in terms of the users.

BRIEF DESCRIPTION OF INVENTION

A slider support member according to the present invention providing a movable connection between a camera and a support member secured to the ground comprises two tracks; a member connecting the tracks to each other from one of their ends; movable connection members, each thereof comprising a connection part to be connected to the camera or the support member, and one thereof comprising a movable member and being connected to the tracks in a movable manner so as to leave the tracks between the movable members, and the other thereof being connected to the tracks in a movable manner so as to stay between the tracks; and a control unit comprising a motor providing the drive of a belt, a controller controlling the operation of the motor, an adjustment switch to transfer the operation parameter of the motor to the controller, and at least one sensor detecting the presence of the hand of the respective user and controlling the drive of the motor by transmitting a trigger signal to the controller.

The displacement range of a camera secured to the slider support member according to the present invention is increased by virtue of at least two movable connection members comprised by the slider support element and moved relative to the track, one of said connection members being secured to at least one camera and the other at least one connection member being secured to a support member secured to the ground.

OBJECT OF INVENTION

The object of the present invention is to develop a slider support member providing the displacement of a camera along one axis.

A further object of the present invention is to develop a reliable and easily-used slider support member which occupies less space.

DESCRIPTION OF FIGURES

Illustrative embodiments of the slider support member according to the present invention are illustrated in the accompanying figures briefly described hereunder.

Figure 1:
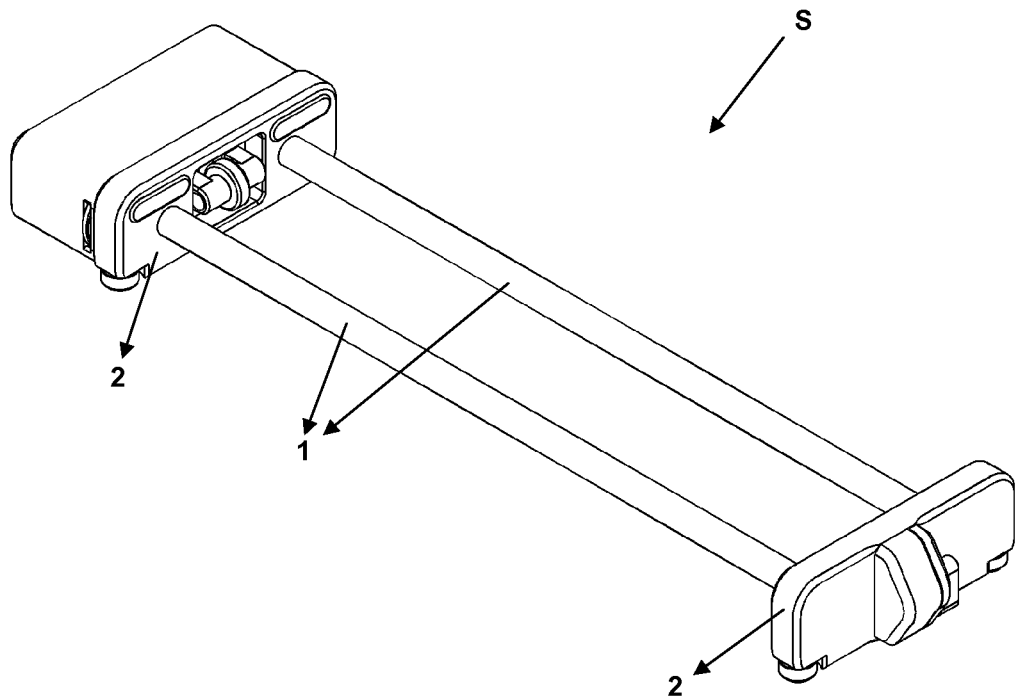
FIG. 1 is a perspective view of tracks comprised by a slider support member according to the present invention.
Figure 2:
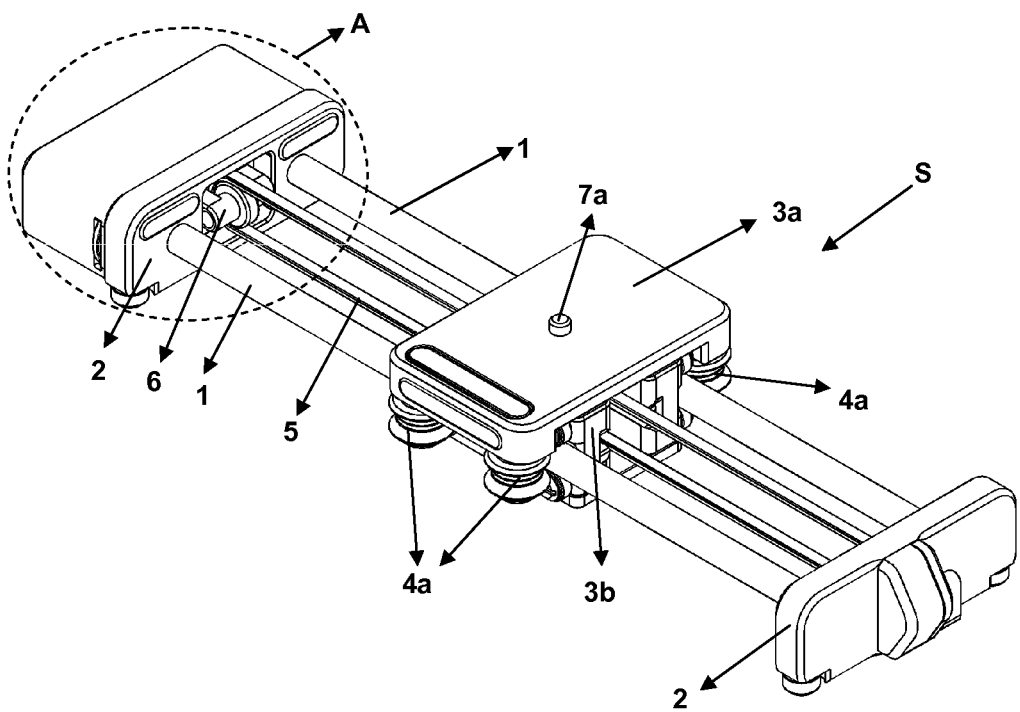
FIG. 2 is a top perspective view of the slider support member according to the present invention.
Figure 3:
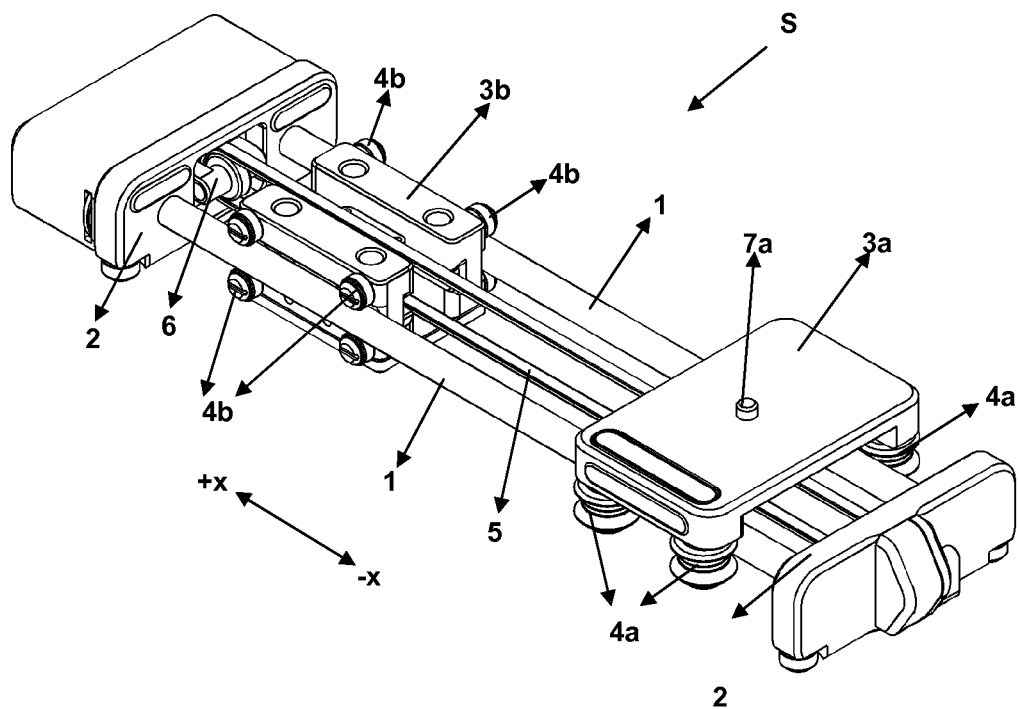
FIG. 3 is another top perspective view of the slider support member according to the present invention.
Figure 4:
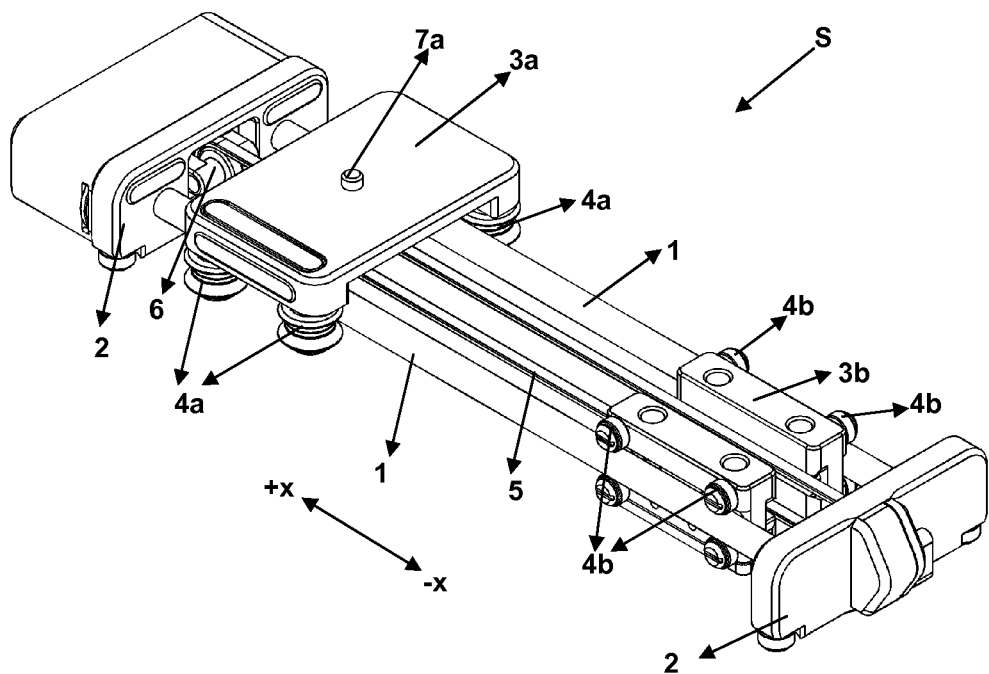
FIG. 4 is another top perspective view of the slider support member according to the present invention.
Figure 5:
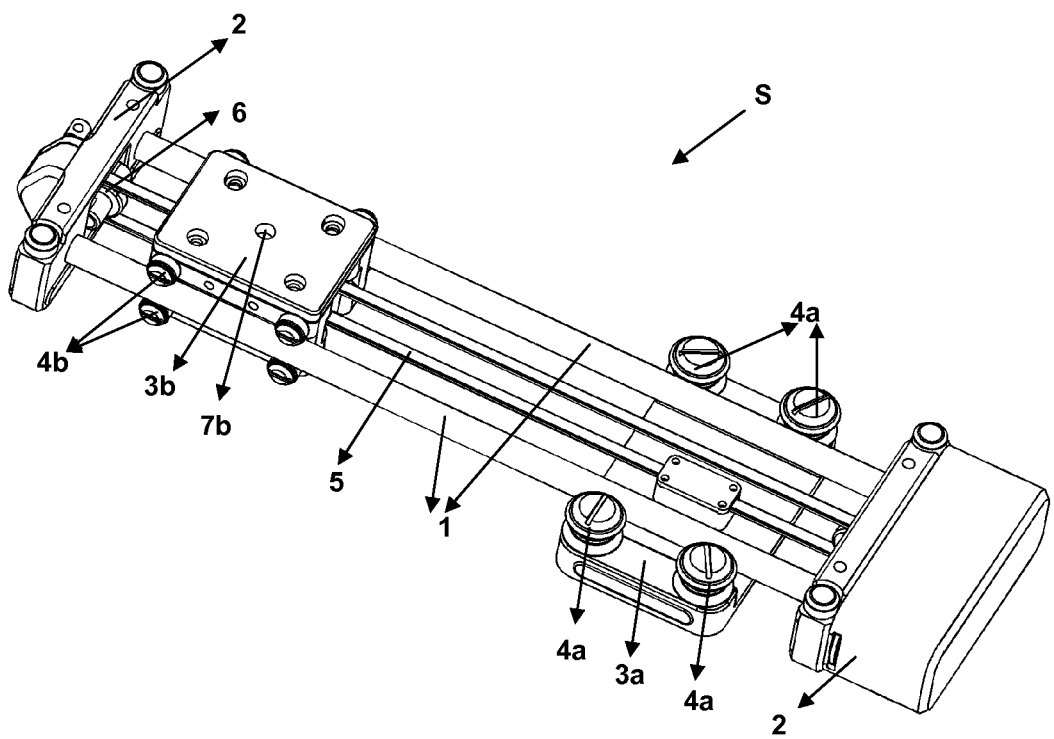
FIG. 5 is a bottom perspective view of the slider support member according to the present invention.
Figure 6:
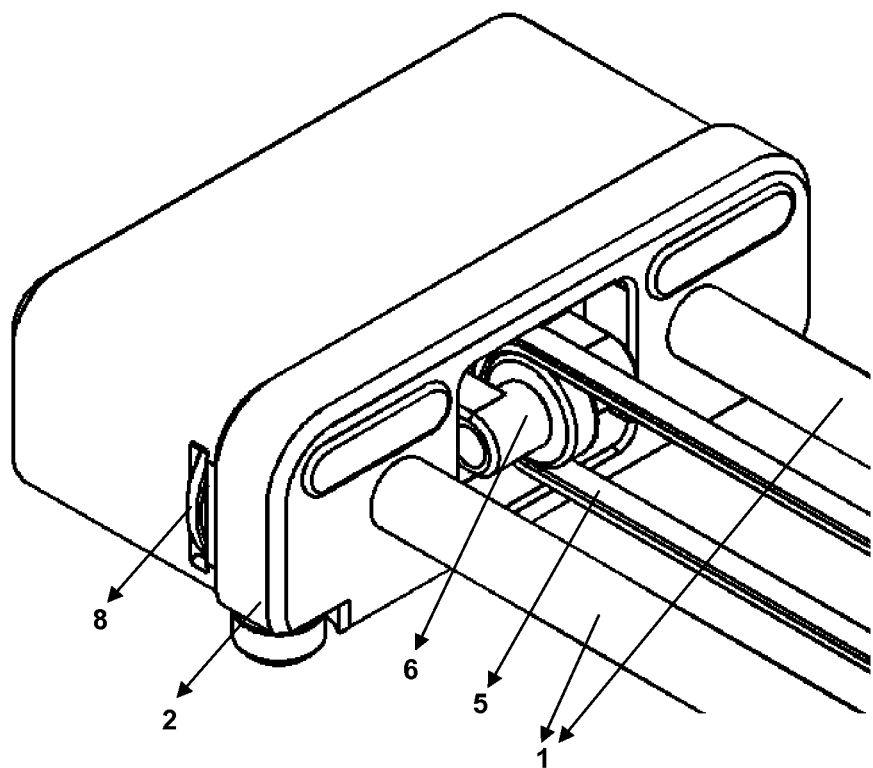
FIG. 6 is a view of detail A given in FIG. 2.

The components in said figures are individually referenced as following.

Slider support member (S)
Track (1)
Retaining member (2)
Movable connection member (3a, 3b)
Movable member (4a, 4b)
Belt (5)
Pulley (6)
Connection part (7a, 7b)
Control member (8)
Control unit (9)
Adjustment switch (10)

DESCRIPTION OF INVENTION

Cameras, e.g. photographic cameras or movie cameras, can be secured to the ground by means of support members to prevent the vibrations caused by moving the camera from affecting the captured images. However, while the pictures are taken, it may be necessary to move the camera along an axis. For this reason, a slider support member is developed according to the present invention for providing the displacement of a camera along one axis.

As illustrated in FIGS. 1-6, a slider support member (S) according to the present invention comprises at least two tracks which are preferably parallel to each other; at least two retaining members (2) connecting two tracks (1) to each other from one of their ends; and at least two movable connection members (3a, 3b), each thereof comprising at least one connection part (7a, 7b) to be connected to at least one camera (not illustrated in the figures) or to at least one support member (not illustrated in the figures), at least one (3a) thereof comprising at least two movable members (4a) preferably in the form of wheels and being connected to the tracks (1) in a movable manner so as to leave the tracks (1) between the movable members (4a), and at least the other one (3b) thereof being connected to the tracks (1) in a movable manner so as to stay between the tracks (1). Said tracks (1) preferably have a cylindrical tube form. The support member, to which the movable connection members (3a, 3b) are connected, can be in the form of a tripod or a Mitchell Mount.

In a representative embodiment according to the present invention, one movable connection member (3a) is connected to the tracks (1) in such a way that the tracks (1) are left between at least two movable members (4a) of the movable connection member (3a) (preferably between a total of four movable members (4a), so that each two movable members (4a) make contact with one track). A camera, in turn, is secured to the said movable connection member (3a) by means of at least one connection part (7a). Thus, the camera can be displaced along the tracks of the movable support member (S). In this embodiment, at least one other movable support member (3b) is also disposed between the tracks (1) so as to be moved along the tracks (1). The movable connection member (3b) placed between the tracks (1) is secured to a support member (e.g. a tripod) which is fixed to the ground. Thus, it becomes possible to displace the movable support member (S) relative to the support member secured to the ground. The displacement range of the camera relative to the support member secured to the ground can be increased by displacing the camera relative to the movable support member (S) and displacing the movable support member (S) relative to the support member secured to the ground. For instance, in an exemplary embodiment where the length of the track (1) is 1 meter, the camera can be displaced along an axis of about 2 meters.

In a preferred embodiment of the present invention, the movable connection member (3b) placed between the tracks (1) comprises at least two movable members (4b) facilitating the movement relative to the tracks, each thereof making contact with at least one track (1), and having preferably the form of a wheel. The movable members (4a, 4b) disposed in the connection members (3a, 3b) are structured so as to perform a rotational motion on the tracks (1). According to this embodiment, the rotation axes of the movable members (4a) disposed in the movable connection member (3a) surrounding the tracks (1) and the rotation axes of the movable members (4b) disposed in the movable connection member (3b) placed between the tracks (1) are preferably perpendicular to each other. Thus, said movable members (4a, 4b) do not affect each other in terms of their displacements.

In another preferred embodiment according to the present invention, the movable support member (S) comprises at least one pulley (6) disposed in each one retaining member (2) and at least one belt (5) connected to the pulleys (6) so as to make a rotational motion between these pulleys (6), at least one side of the pulley being connected to a movable connection member (3a) and at least one other side of the pulley being connected to another movable connection member (3b). According to this embodiment, while one movable support member (3a) is displaced on a direction on the tracks (e.g. the +x direction), the other movable support member (3b) is displaced on the opposite direction (e.g. the −x direction) on the tracks (1). Thus, when one movable support member (3a) is connected to the camera and the other movable support member (3b) is secured to a support member fixed to the ground, the user can control the movement of the entire system by only controlling the displacement of the camera. Put differently, when the user keeps the camera at one position, the movement of the tracks (1) is prevented and any vibrations, which may occur while pictures are taken, are avoided.

In a further preferred embodiment according to the present invention, said belt (5) is in the form of a timing belt. According to this embodiment, the belt (5) in the form of a timing belt preferably has a plurality of teeth on its outer surface (on the surface not contacting the pulleys (6)). According to this embodiment, at least one of the retaining members (2) preferably comprises at least one drive unit providing the displacement of the belt (5) by making contact with said teeth. This drive unit can comprise a motor which may have at least one gear disposed on the rotor thereof. Thus, the displacement of the camera on the movable support member (S) can be controlled e.g. using a controller by electronically controlling the operation of said motor.

In a further preferred embodiment according to the present invention, at least one retaining member (2) comprises at least one control member (8) controlling the movement of the pulley (6) it comprises and the belt (5) connected to this pulley (6). Said control member (8) is preferably in the form of a switch which prevents the motion of the belt (5) by jamming the belt (5) and the pulley (6). Since the motion of the belt (5) can be prevented by virtue of this control member (8), the displacement of the movable connection members (3a, 3b) connected to the belt relative to the tracks (1) and to each other can also be prevented. In other terms, the user can fix the position of the camera secured to one movable connection member (3a) using said control member (8).

Figure 7:
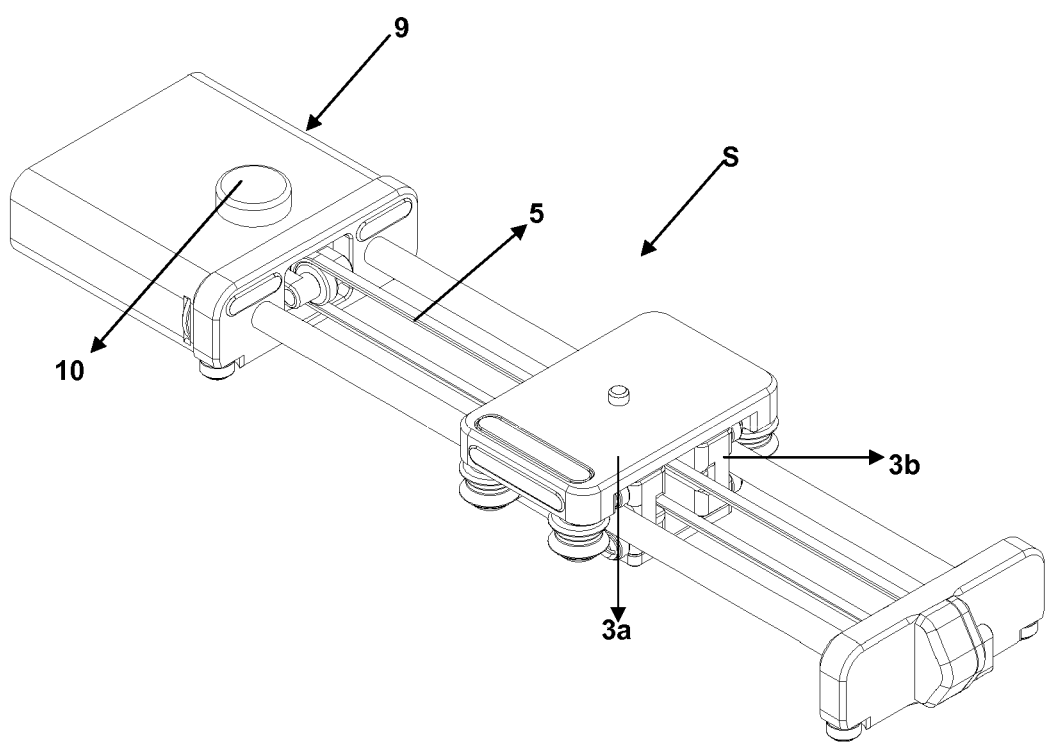
FIG. 7 is a top perspective view of an alternative embodiment of the slider support member according to the present invention.

In an alternative embodiment according to the present invention, said slider support member (S) comprises at least one control unit (9), of which one representative view is given in FIG. 7, to move the belt (5) in a controlled manner. Said control unit (9) comprises at least one motor (not illustrated in the figures) providing the drive of the belt (5); at least one controller (e.g. a microprocessor) controlling the operation of the motor; at least one adjustment switch (10) to transfer at least one operation parameter of the motor to the controller by the user; and at least one sensor detecting the presence of the hand of the user and controlling the drive of the motor (i.e. activating the still motor or stopping the running motor) by transmitting a trigger signal to the controller when the user moves away his/her hand from the adjustment switch (10). According to this embodiment, the user adjusts an operation parameter of the motor using said adjustment switch (10) (e.g. the running speed of the motor, i.e. the speed of the belt (5) and of the camera secured to at least one movable connection member (3a)). Once the user makes an adjustment, he/she moves away his/her hand from the adjustment switch (10). When the sensor detects that the hand is moved away, it sends a trigger signal to the controller. Upon receiving this trigger signal, the controller controls the drive of the motor according to the adjustment made (i.e. activating the still motor or stopping the running motor).

In a preferred embodiment according to the present invention, the sensor is in the form of a touch sensor disposed on the adjustment switch (10). According to this embodiment, the sensor detects that the user moves away his/her hand from the adjustment switch (10). However, the user's hand may still be in contact with the control unit (9) even if it is moved away from the adjustment switch (10). In such a case, undesired vibrations may occur during the displacement of the camera since the user's hand is in contact with the control unit (9). In order to prevent these undesired vibrations according to this embodiment, the motor is not immediately driven after the trigger signal is sent from the sensor to the controller, and a predetermined time period is elapsed to let the user move away his/her hand a sufficient distance from the control unit (9).

In an alternative embodiment according to the present invention, the sensor is in the form of a distance sensor disposed on the controller unit (9). According to this embodiment, when the user moves away his/her hand from the control unit (9) a predefined distance based on a user-set value, a trigger signal is sent from the sensor to the control unit. Thus, the motor drive and therefore the displacement of the camera connected to the belt (5) and to a movable connection member (3a) are prevented during the time period in which the user contacts the control unit (9).

In a further preferred embodiment according to the present invention, the control unit (9) comprises at least one power unit (not illustrated in the figures) energizing the motor and/or the controller. Said power unit is preferably in the form of a battery or an accumulator.

The displacement range of a camera secured to the slider support member (S) according to the present invention is increased by virtue of at least two movable connection members (3a, 3b) comprised by the slider support element (S) and moved relative to the track (1), one of said connection members being secured to at least one camera and the other at least one connection member being secured to a support member fastened to the ground. Additionally, the camera can used in an easy and reliable manner by virtue of using said pulley (6) and belt (5) system and the control member (8).

The invention claimed is:

1. A slider support member for connecting a camera to a support member which is secured to the ground in a movable manner, comprising
    at least two tracks;
    at least two retaining members connecting said tracks to each other on each end of the at least two tracks;
    at least two movable connection members, each of the moveable connection members comprising at least one connection part to be connected to at least one camera or to at least one support member, at least one of the movable connection members comprising at least two outer movable members being connected to the at least two tracks in a movable manner so as to position the at least two tracks between the outer movable members, and at least the other one of the at least two movable connection members comprising at least two inner movable members that are connected to the at least two tracks in a movable manner so as to stay between the at least two tracks;
    at least one pulley disposed in each of the at least two retaining members; and
    at least one belt connected to the at least one pulley so as to make a rotational motion between the at least one pulley, at least one side of the belt being connected to at least one of the at least two movable connection members and at least one other side of the belt being connected to another of the at least two movable connection members.

2. The slider support member according to claim 1, wherein said tracks are in the form of a cylindrical tube.

3. The slider support member according to claim 1, wherein the rotation axes of each of the at least two inner and outer movable members disposed in different movable connection members are perpendicular to each other.

4. The slider support member according to claim 1, wherein the belt is in the form of a timing belt comprises a plurality of teeth on an outer surface.

5. The slider support member according to claim 1, further comprising
    at least one control unit comprising at least one motor providing drive of the belt; at least one controller to control operation of the motor; at least one adjustment switch to transfer at least one operation parameter of the motor to the controller; and at least one sensor to detect the presence of a hand of a user and control the drive of the motor by transmission of a trigger signal to the controller in response to detection of the hand of the user moving away from the adjustment switch.

6. The slider support member according to claim 1, wherein at least one retaining member comprises a control member to control the movement of the at least one pulley and the belt connected to the at least one pulley.

7. The slider support member according to claim 4, wherein at least one of the retaining members comprises at least one drive unit providing displacement of the belt by making contact with said teeth.

8. The slider support member according to claim 5, wherein said sensor is in the form of a touch sensor disposed on the adjustment switch.

9. The slider support member according to claim 5, wherein said sensor is in the form of a distance sensor disposed on the control unit.

10. The slider support member according to claim 5, wherein said control unit comprises at least one power unit energizing the motor and/or the controller.

11. The slider support member according to claim 6, wherein the control member comprises a switch that is switchable to jam the rotational motion of the at least one pulley to prevent movement of the belt.

12. A slider support member, comprising
    a pair of tracks, each having a first end and a second end;
    a first retaining member coupled to the first ends of the pair of tracks;
    a second retaining member coupled to the second ends of the pair of tracks;
    an outer connection member movable on the pair of tracks, wherein the first connection member comprises at least two outer movable members, each being connected to a respective one of the pair of tracks in a movable manner so as to position the tracks between the outer movable members;
    an inner connection member movable on the pair of tracks, wherein the second connection member comprises at least two inner movable members, each being connected to a respective one of the pair of tracks in a movable manner so as to be positioned between the tracks;
    a pulley disposed in each of the first and second retaining members;
    a belt engaged with the pulleys so as to cooperatively rotate the pulleys, a first side of the belt being connected to the outer connection member and a second side of the belt being connected to the outer connection member; and
    wherein the outer and inner connection members each comprise at least one connection part to be connected to at least one camera or to at least one support member.

13. The slider support member according to claim 12, wherein the outer and inner connection members each comprise at least four inner and outer movable members, so that each of the outer and inner connection members comprises a pair of inner and outer movable members connected to each of the pair of tracks.

14. The slider support member according to claim 12, wherein displacement of one of the outer or inner connection members causes displacement of the other of the outer or inner movable connection members in the opposite direction.

15. The slider support member according to claim 12, wherein the at least two inner and outer movable members are moveable rotationally on the pair of tracks.

16. The slider support member according to claim 12, further comprising a first side and a second side opposite the first side, wherein the outer connection member is arranged on the first side, and the inner connection member is arranged on the second side.

17. The slider support member according to claim 12, wherein at least one of the first or second retaining members comprise a control member operable to control the movement of the belt engaged with the pulleys.

18. The slider support member according to claim 12, wherein the belt is a timing belt and comprises a plurality of teeth on an outer surface of the belt.

19. The slider support member according to claim 15, wherein the rotational axes of the at least two outer movable members of the outer connection member are perpendicular to the rotational axes of the at least two inner movable members of the inner connection member.

20. The slider support member according to claim 17, wherein the control member comprises a switch operable to prevent the rotational motion of at least one of the pulley disposed in the first retaining member or the pulley disposed in the second retaining member.

\* \* \* \* \*